United States Patent [19]

Dirks et al.

[11] 3,815,083

[45] June 4, 1974

[54] METHOD AND ARRANGEMENT FOR SORTING RECORD UNITS HAVING KEYFIELD BITS ARRANGED IN DESCENDING ORDER OF SIGNIFICANCE WITHOUT COMPARATOR

[75] Inventors: Gerhard Dirks, Los Altos Hills; Paul F. Schenck, Mountain View, both of Calif.

[73] Assignee: Dirks Electronics Corporation, Sunnyvale, Calif.

[22] Filed: July 13, 1971

[21] Appl. No.: 162,172

Related U.S. Application Data

[63] Continuation-in-part of Ser. No. 104,658, Jan. 7, 1971, Pat. No. 3,714,634.

[52] U.S. Cl. .......... 340/172.5

[51] Int. Cl. .......... G06f 7/06

[58] Field of Search .......... 340/172.5

[56] References Cited

UNITED STATES PATENTS

| | | | |
|---|---|---|---|
| 2,674,733 | 4/1954 | Robbins | 340/172.5 X |
| 3,034,102 | 5/1962 | Armstrong | 340/172.5 |
| 3,183,484 | 5/1965 | Christiansen | 340/172.5 X |
| 3,311,892 | 3/1967 | O'Conner | 340/172.5 |
| 3,336,580 | 8/1967 | Armstrong | 340/172.5 |
| 3,399,383 | 8/1968 | Armstrong | 340/172.5 |

*Primary Examiner*—Paul J. Henon

*Assistant Examiner*—John P. Vandenburg

*Attorney, Agent, or Firm*—Townsend & Townsend

[57] ABSTRACT

Record units, each addressable by a record unit address, have keyfields with keyfield bits arranged to be presented in descending order of significance. The record unit addresses are separated into first and second address groups, comprising all addresses corresponding, respectively, to record units having a most significant keyfield bit of 0 and 1. The first and second address groups are each similarly subdivided into two successive address sub-groups in dependence on the next most significant keyfield bit of each record unit. The separating process of each successive sub-groups of addresses is continued under control of equally weighted bits from each record unit until all keyfield bits have been utilized. A system of indicator numbers are assigned to each record unit address and are modified during each successive sub-grouping to reflect from which of the immediately preceding sub-groups the address is derived.

29 Claims, 6 Drawing Figures

TABLE E

| | Bit Value 2 | | | | | | | | |
|---|---|---|---|---|---|---|---|---|---|
| 1 | Group # | 0 | 0 | 0 | 0 | 1 | 2 | 2 | 2 |
| 2 | Addr. Stor.B(0) | 4 | | | | 5 | 2 | 6 | |
| 3 | Addr. Reg. B(1) | | 0 | 1 | 7 | | | | 3 |
| 4 | Keyfield Value | 1 | 1 | 0 | 1 | 0 | 1 | 0 | 1 |
| 5 | Group # | 0 | 1 | 1 | 1 | 2 | 3 | 3 | 4 |
| 6 | Addr. Stor.A(0) | | | 1 | | 5 | | 6 | |
| 7 | Addr. Reg. A(1) | 4 | 0 | | 7 | | 2 | | 3 |

TABLE F

| | Bit Value 1 | | | | | | | | |
|---|---|---|---|---|---|---|---|---|---|
| 1 | Group # | 0 | 1 | 1 | 1 | 2 | 3 | 3 | 4 |
| 2 | Addr. Stor.A(0) | | 1 | | | 5 | 6 | | |
| 3 | Addr. Reg. A(1) | 4 | | 0 | 7 | | | 2 | 3 |
| 4 | Keyfield Value | 0 | 1 | 1 | 0 | 0 | 0 | 1 | 0 |
| 5 | Group # | 0 | 1 | 2 | 2 | 3 | 4 | 5 | 6 |
| 6 | Addr. Stor.B(0) | 4 | | | 7 | 5 | 6 | | 3 |
| 7 | Addr. Reg. B(1) | | 1 | 0 | | | | 2 | |

TABLE G

| | Bit Value 0 | | | | | | | | |
|---|---|---|---|---|---|---|---|---|---|
| 1 | Group # | 0 | 1 | 2 | 2 | 3 | 4 | 5 | 6 |
| 2 | Addr. Stor.B(0) | 4 | | 7 | | 5 | 6 | | 3 |
| 3 | Addr. Reg. B(1) | | 1 | | 0 | | | 2 | |
| 4 | Keyfield Value | 0 | 0 | 0 | 0 | 0 | 0 | 0 | 0 |
| 5 | Group # | 0 | 1 | 2 | 3 | 4 | 5 | 6 | 7 |
| 6 | Addr. Stor.A(0) | 4 | 1 | 7 | 0 | 5 | 6 | 2 | 3 |
| 7 | Addr. Reg. A(1) | | | | | | | | |

TABLE H

| Sequence of Data | | | | | | | | |
|---|---|---|---|---|---|---|---|---|
| R.U. Address | 4 | 1 | 7 | 0 | 5 | 6 | 2 | 3 |
| Keyfield Value | 2 | 5 | 6 | 7 | 8 | 10 | 13 | 17 |

FIG. 1a

INVENTOR.
GERHARD DIRKS
PAUL SCHENCK
BY Michael S. Striker
ATTORNEY

COLUMNS 1 2 3 4 5 6 7 8 9 LINES

TABLE A

| Sequence of Data | | | | | | | | | LINES |
|---|---|---|---|---|---|---|---|---|---|
| R.U. Address | 0 | 1 | 2 | 3 | 4 | 5 | 6 | 7 | 1 |
| Keyfield Value | 7 | 5 | 13 | 17 | 2 | 8 | 10 | 6 | 2 |
| Binary Rep. 1 | 1 | 1 | 1 | 1 | 0 | 0 | 0 | 0 | 3 |
| 2 | 1 | 0 | 1 | 1 | 1 | 0 | 0 | 1 | 4 |
| 4 | 1 | 1 | 0 | 1 | 0 | 0 | 0 | 1 | 5 |
| 8 | 0 | 0 | 0 | 0 | 0 | 1 | 0 | 0 | 6 |
| 10 | 0 | 0 | 1 | 1 | 0 | 0 | 1 | 0 | 7 |
| 20 | 0 | 0 | 0 | 0 | 0 | 0 | 0 | 0 | 8 |
| 40 | 0 | 0 | 0 | 0 | 0 | 0 | 0 | 0 | 9 |
| 80 | 0 | 0 | 0 | 0 | 0 | 0 | 0 | 0 | 10 |

TABLE B

| | Bit Value 10 | | | | | | | | |
|---|---|---|---|---|---|---|---|---|---|
| 1 | Group # | 0 | 0 | 0 | 0 | 0 | 0 | 0 | 0 |
| 2 | Addr. Stor.A(0) | 0 | 1 | 2 | 3 | 4 | 5 | 6 | 7 |
| 3 | Addr. Reg. A(1) | | | | | | | | |
| 4 | Keyfield Value | 0 | 0 | 1 | 1 | 0 | 0 | 1 | 0 |
| 5 | Group # | 0 | 0 | 0 | 0 | 0 | 0 | 0 | 0 |
| 6 | Addr. Stor.B(0) | 0 | 1 | | | 4 | 5 | | 7 |
| 7 | Addr. Reg. B(1) | | | 2 | 3 | | | 6 | |

TABLE C

| | Bit Value 8 | | | | | | | | |
|---|---|---|---|---|---|---|---|---|---|
| 1 | Group # | 0 | 0 | 0 | 0 | 0 | 0 | 0 | 0 |
| 2 | Addr. Stor.B(0) | 0 | 1 | 4 | 5 | 7 | | | |
| 3 | Addr. Reg. B(1) | | | | | | 2 | 3 | 6 |
| 4 | Keyfield Value | 0 | 0 | 0 | 1 | 0 | 0 | 0 | 0 |
| 5 | Group # | 0 | 0 | 0 | 0 | 0 | 1 | 1 | 1 |
| 6 | Addr. Stor.A(0) | 0 | 1 | 4 | | 7 | 2 | 3 | 6 |
| 7 | Addr. Reg. A(1) | | | | 5 | | | | |

TABLE D

| | Bit Value 4 | | | | | | | | |
|---|---|---|---|---|---|---|---|---|---|
| 1 | Group # | 0 | 0 | 0 | 0 | 0 | 1 | 1 | 1 |
| 2 | Addr. Stor.A(0) | 0 | 1 | 4 | 7 | | 2 | 3 | 6 |
| 3 | Addr. Reg. A(1) | | | | | 5 | | | |
| 4 | Keyfield Value | 1 | 1 | 0 | 1 | 0 | 0 | 1 | 0 |
| 5 | Group # | 0 | 0 | 0 | 0 | 1 | 2 | 2 | 2 |
| 6 | Addr. Stor.B(0) | | | 4 | | 5 | 2 | | 6 |
| 7 | Addr. Reg. B(1) | 0 | 1 | | 7 | | | 3 | |

FIG. 1b

INVENTOR.
GERHARD DIRKS
PAUL SCHENCK
BY Michael S. Striker
ATTORNEY

INVENTOR.
GERHARD DIRKS
PAUL SCHENCK
BY Michael S. Striker
ATTORNEY

INVENTOR.
GERHARD DIRKS
PAUL SCHENCK

BY Michael S. Striker
ATTORNEY

INVENTOR.
GERHARD DIRKS
PAUL SCHENCK
BY Michael S. Striker
ATTORNEY

INVENTOR.
GERHARD DIRKS
PAUL SCHENCK
BY Michael S. Striker
ATTORNEY

METHOD AND ARRANGEMENT FOR SORTING RECORD UNITS HAVING KEYFIELD BITS ARRANGED IN DESCENDING ORDER OF SIGNIFICANCE WITHOUT COMPARATOR

CROSS REFERENCE TO RELATED APPLICATIONS

This application is a continuation-in-part application of my application entitled "Method and System For Sorting Without Comparator" filed Jan. 7, 1971 with Ser. No. 104,658, now U.S. Pat. No. 3,714,634 issued Jan. 30, 1973.

BACKGROUND OF THE INVENTION

This invention relates to systems and methods for merging and sorting record units in accordance with the keyfield value associated with said record units. Such a record unit may, for example, comprise the name of an individual, his age, his address, his social security number, his annual wage and the number of sick leave days taken. It may of course include any number of other items, depending upon the need of the particular company. The items cited here are simply examples. The record units are then to be arranged in some sequence in accordance with a keyfield value, where keyfield refers to a particular part of the record unit, as, for example, the annual wage of the employee. Each field, including the keyfield, contains one or more alpha-numeric characters. In turn, the alpha-numeric characters are coded by a plurality of bits, each bit having a weight or place value depending upon its position in the field.

The prior art for sorting such record units with a comparator was discussed in the parent application and will not be repeated here.

The present application discloses a method and arrangement of sorting without a comparator, for the case wherein the keyfield bits within the keyfield are arranged to be read in a descending order of significance. The present system and method may be used in an overall system as disclosed in the parent application, the additional equipment and method steps required because of the arrangement of the keyfield bits in descending order of significance being disclosed herein.

SUMMARY OF THE INVENTION

This invention is a method and system of sorting or merging a plurality of record units, each having a keyfield, each of said keyfields comprising a plurality of keyfield bits arranged in descending order of significance, without use of a comparator. In a system in accordance with this invention, register means store said keyfield bits in addressable register locations. First and second record unit address storage means are provided, as are input means operatively associated with said first record unit address storage means. Said input means enter record unit addresses, each providing access to a corresponding record unit, into said first record unit address storage means. Register addressing means are connected to said register means and said first and second record unit address storage means, for furnishing selected keyfield bits at least in part under control of said record unit addresses. Further, address transfer means interconnect said first and second record unit address storage means and said register means, for transferring record unit addresses back and forth between said first and second record unit address storage means at least in part under control of said selected keyfield bits, in such a manner that the storage location of each of said record unit addresses following a transfer is a function of the 0 or 1 value of the corresponding selected keyfield bit and of the values of the keyfield bits within the same keyfield preceding said selected keyfield bit in said descending order of significance.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIGS. 1*a* and 1*b* are a series of tables illustrating the method of the present invention;

DESCRIPTION OF THE PREFERRED EMBODIMENTS

Figure 2:
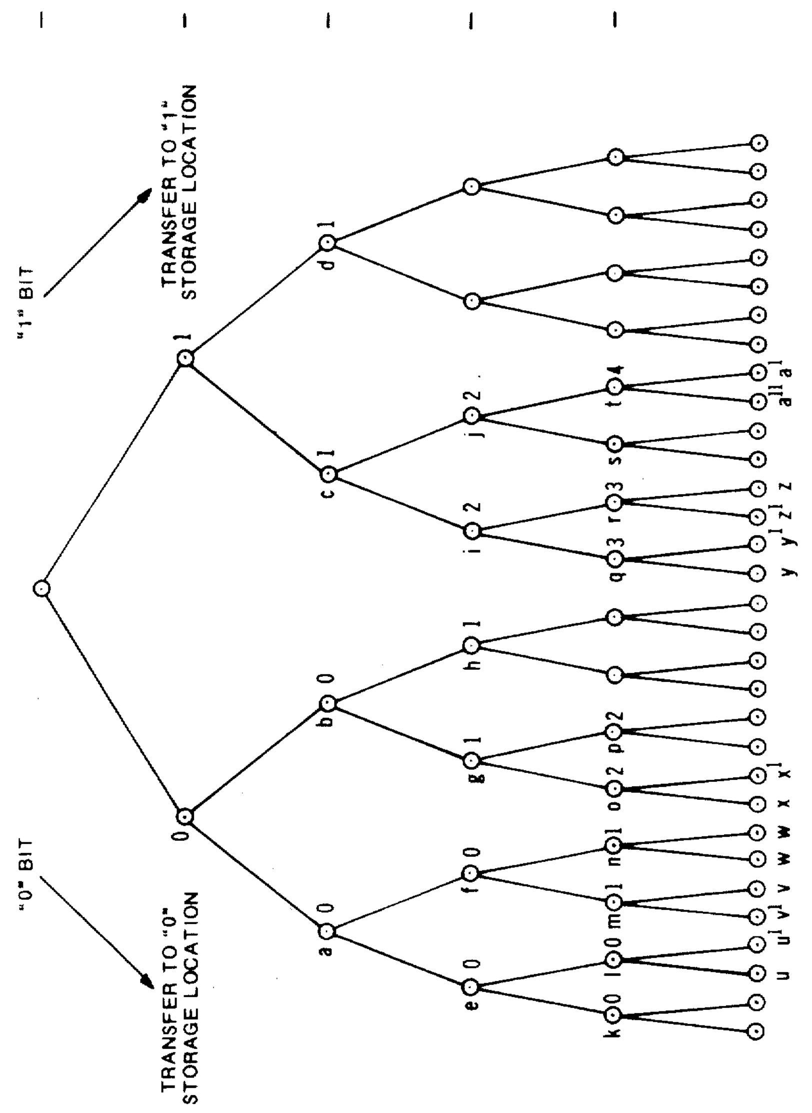
FIG. 2 shows a diagram illustrative of the method of the present invention.

The preferred embodiment of the present invention will be described with reference to the drawing.

Before proceeding with the description of the method of the present invention, as illustrated in FIGS. 1*a*, 1*b* and 2, a number of definitions and a discussion of some of the terms used in this application will be furnished. This discussion and the definitions were presented in the parent application. However, they are repeated here in order that this application may in and of itself be an understandable unit.

The record units to be sorted by the method of the present invention are record units as described in the Background of the Inventin of this application and are to be sorted in accordance with the keyfield value. Each keyfield may comprise a plurality of alpha-numeric characters, these characters being coded by bits, each of the bits having either a 0 or a 1 value, respectively signifying the absence and presence of the value associated with the bit. The weight or significance of each bit depends upon its position in the keyfield bit sequence. For example, a keyfield value of 7 might be illustrated by the sequence 111, where the first bit has a weight of 1, the second a weight of 2, and the third a weight of 4. In a serial type of system, these bits may be furnished in sequence as they are read out from a cyclic storage for example. The time at which a bit of a particular weight is available for sensing is a bit time. Associated with each bit time is a timing signal called a bit time clock pulse (btcl). When bits of a particular record unit are read out in sequence, followed by bits of the subsequent record unit, the system is a non-interlaced system. In an interlaced system, each bit time is divided into substantially equal parts, each part being called a subbit time. In such an interlaced system, each set of bits, comprising the bits included between consecutive bit times, comprises an equally weighted bit from each record unit. Thus the number of bits in each set of bits occurring between consecutive bit times is equal to the number of record units to be sorted. Bits of the same record unit always occur in the same subbit time. For example if, following the first bit time, bits of record units A,B,C, and D are furnished in subbit times in that order, following the next bit time, the same order will prevail. In other words, in an interlaced system, a bit is related to a specific record unit by its position within the set of equally weighted bits.

It should also further be noted that subbit times are herein alternatively referred to as time slots.

The method in accordance with this invention, whose object it is to sort these record units into a sequence in order of keyfield value, will now be illustrated with reference to the tables constituting FIGS. 1*a* and 1*b*.

Said table shows the keyfield values of eight record units in the sequence in which these record units are originally stored. This is a completely arbitrary sequence. Record unit addresses 0 to 7 as shown in line 1 have been assigned arbitrarily, each to a corresponding keyfield and corresponding record unit. Address words serve as identification of independent record units and provide access to these record units. In a serial type of system, the record unit address determines the record unit of which a bit is to be read out. The place value or significance of the bit is a function of the time, relative to a starting time, at which the bit is read out.

Column 1, lines 3 to 10 indicate the bit weight assignment to, or significance of, the bits representing the keyfield values. In each of columns 2 to 9, the bit patterns of each of the eight keyfields are shown. The values of keyfields have been restricted to less than 20 to keep the example short. All bits representing weights of 20 and above will be 0-bits and not cause any change or action in this operation. The first keyfield has the value 7, represented by the bit pattern 11100. For purposes of explanation it will be assumed that the keyfield bits are made available (i.e. read) by the disclosed keyfield storage register means in an order from right to left as written herein. Thus, the most significant bit will be presented first. Address 0 is assigned to this keyfield and to the record unit of which this keyfield is a part. The second keyfield shown in column 3 has the value 5, represented by the bit pattern 10100 and is accessible at record unit address 1. The third keyfield, column 4, has the value 13, represented by bit pattern 11001 located at record unit address 2. The record unit addresses and keyfield values of the remaining units can be similarly derived.

In accordance with the present invention, the record unit addresses, as listed in line 1, are furnished in an arbitrary sequence. Arbitrary sequence here refers to the keyfield values; that is, it can be seen that the keyfield values in line 2 are not arranged in order. The arbitrary sequence therefore is the sequence of record unit addresses 0 through 7 as shown in line 1 of FIG. 1. These record unit addresses are separated into first and second address groups which comprise, respectively, record units having a most significant keyfield bit 0 and 1. For purposes of this example and as shown in FIGS. 1*a* and 1*b*, the most significant keyfield bit present in any of the record units is the keyfield bit representing the value 10. The table headed "Bit Value 10" shows first the arbitrary address sequence in line 2. Further it shows in line 4, the keyfield value of either 0 or 1 which is the most significant keyfield bit in the keyfield whose address is stored in the same column in line 2. Thus record unit addresses 0,1,2, and 3, respectively, have most significant keyfield bits of 0, 0, 1, and 1. The remaining keyfield bit values for the other record unit addresses, namely addresses 4,5,6, and 7 are 0, 0, 1, and 0. The first address group as shown in line 6 therefore comprises record unit addresses 0,1,4,5 and 7, while the second address group, shown in line 7, of the table headed "Bit Value 10" comprises record unit addresses 2,3, and 6. In order to clarify the terminology in the tables which constitute FIGS. 1*a* and 1*b* of the present invention, it might be useful to say at this point that the address groups of this invention are always formed in the equipment by storing the relevant record unit addresses sequentially following a 0 assigned storage location" and a 1 assigned storage location in each of two record unit address storage means. The latter are herein referred to as address storages A and address storage B. In the table, storage address A (0), A(1), B(0), and B(1), refer to respectively, consecutive storage locations following the "0 assigned storage location" and the "1 assigned storage location" in the first and second record unit address storage means (A and B), respectively.

It is obvious from the table headed "Bit Value 10" that record unit addresses 2,3, and 6 address record units having keyfield values larger than the keyfield values of the remaining record units.

Referring now to the table headed "Bit Value 8," it is seen that the first and second address sequences are shown again in lines 2, and 3. Line 4, however, now contains the the second most significant keyfield bit in each keyfield associated with the record unit address shown in lines 2 and 3. For example, the second most significant keyfield bit for the record unit having an address of 1 is 0, that having an address of 7 is 0, and that having an address of 6 is also 0. The first address group, shown in line 2, is divided into two additional subgroups shown respectively in lines 6 and 7 under control of the second most significant keyfield bit as shown in line 4. Thus the first address group is divided into a first sub-group having record unit addresses 0, 1, 4, and 7, and a second sub-group containing record unit address 5 only. Similarly the second address group shown in line 3 is divided into a first sub-group containing record unit addresses 2, 3, and 6 a second sub-group which is empty, since the second most significant bit in the keyfields associated with record unit addresses 2, 3, and 6 are all 0 as shown in line 4.

This separating of the first and second address groups each into pairs of sub-groups is accomplished by first reading out, in sequence, the addresses in the first address group as stored in addresss storage B(0) [see line 2]; and transferring record unit addresses addressing record units having a second most significant keyfield bit of 0 to consecutive storage locations in address storage A(0) and record unit addresses addressing record units having a second most significant keyfield bit of 1 to consecutive storage locations in address storage A(1). The same method applies in dividing the second address sequence into two additional sequences. Since the same address storage A is used in the embodiment of the present invention for storing both the two subgroups containing members of the first address group and the two sub-groups containing members of the second address group, additional means must be provided for differentiating between storage locations in address storage A which store record unit addresses previously contained in the first or in the second address group.

In the method of this invention, the record unit addresses which were originally members of the second address group are furnished with an indicator or group number of 1, while the remaining record unit addresses have a group number of 0. The group numbers shown in line 5 of the table headed "Bit Value 8" thus differentiate record unit addresses having a most significant keyfield of 1 from those having a most significant keyfield bit of 0. Whether a record unit address is stored in address storage A(0) or A(1) depends on the value of the second most significant bit.

The next sorting step will now be discussed with relationship to the table headed "Bit Value 4." It is seen that three out of four possible address sub-groups are present. One of the address sub-groups, as stated in the discussion of the table headed "Bit Value 8," is absent since none of the members of the second address group had a second most significant keyfield bit of 1. Reference to lines 2 and 3 of the table headed "Bit Value 4" shows a first address subgroup stored in address storage A(0) and containing record unit addresses 0,1,4, and 7 having respectively third most significant keyfield bits of 1,1,0, and 1. A second address sub-group is stored in address storage A(1) and contains only record unit address 5 having a third most significant keyfield bit of 0. A third address sub-group, as identified by group number 1 and also stored in address register A(0), contains record unit addresses 2,3, and 6, respectively having third most significant keyfield bits of 0,1, and 0. The division of the address subgroups now stored in address storage A is accomplished by transfer to address storage B in the following manner. First, the record unit addresses are read out from address storage A in an order determined by the value of previous (more significant) keyfield bits, i.e., by their group numbers. The transfer then occurs to either address storage B(0), or B(1) as a function of the third most significant keyfield bit. Thus record unit addresses 0, 1, 4, and 7, are first read out, record unit addresses 0, 1, and 7, being transferred to address storage B(1), while record unit address 4 is transferred to address register B(0). Record unit address 5, previously stored in address storage A(1) is transferred to address storage B(0) since its third most significant keyfield bit is 0. However, a group number of 1 is furnished in conjunction with this record unit address to differentiate it from record unit address 4 also stored in B(0) but having previous keyfield bits of 0 only. Since group number 1 now identifies a record unit address addressing a record unit having a second most significant keyfield bit of 1, the group number of record unit addresses 2,3, and 6, must be increased to 2 in order to differentiate record unit addresses corresponding to a most significant keyfield bit of 1 from record unit address 5. Therefore group number 2 is assigned to each of record unit addresses 2, 3, and 6, record unit addresses 2 and 6 being stored in address storage B(0), since the third most significant keyfield bit is 0 for these record units. Record unit address 3, also having group number 2, is stored in address storage B(1), since the third most significant keyfield bit associated therewith is a 1. In the tables of FIG. 1, the read-out from storage, during each transfer step, proceeds in an order starting from the left and continuing towards the right. That is, the read-out is determined by the group number. Within each group number, the read-out is first of storage positions following the "0 assigned storage position," and then proceeds to read-out of "1 assigned storage locations." Since, again during the transfer, the group numbers and the read-out storage locations are determined by previously evaluated keyfield bits, it is seen that the read-out takes place in order of keyfield value as determined by previously evaluated keyfield bits. Specifically, the examples shown in FIG. 1, the record unit addresses are read out in correspondence to ascending keyfield values insofar as known by evaluation of previous keyfield bits. The record unit addresses are transferred into storage locations of the other of the two address storage means as a function of the value of the present keyfield bit. Therefore the final storage location, after each transfer, of a record unit address is a function of all evaluated keyfield bits. It is seen that continuing this type of transfer under control of keyfield bits of all remaining bit values (bit value 2 and bit value 1 of the present example) will result in having the record unit addresses stored in one of the storages in a sequence of ascending keyfield value. The transfer shown under the heading "Bit Value 1" is of course effected only to cause all record unit addresses to be stored consecutively in one of the storage means. The actual order is already established under the transfer according to the table headed "Bit Value 1." The final sequence of record unit addresses is shown under the title "Sequence of Data." It is seen that, as stated above, the record unit addresses are in sequence of increasing keyfield value.

FIG. 2 is a line diagram showing perhaps even more clearly than the above tables the theoretical basis for the method of the present invention. All record unit addresses are assumed to be furnished at the origin labeled 0. From there these are divided into first and second groups, the record unit addresses addressing a record unit having a most significant keyfield bit of 0 and 1 being transferred in the direction indicated by the 0 bit arrow and the 1 bit arrow, respectively. Nodes 0 and 1 represent the first and second address groups respectively. The first address group is again broken up into two sub-groups, respectively, having a 0 and 1 second most significant bit (bit 8 1 or 0). In FIG. 2, the nodes are given letters for reference. The numbers associated with each node are the group numbers. It should be noted that the address sub-groups denoted by node *a* and *c*, are, in the arrangement in this invention, both stored in the same group of storage locations. The identification between node *a* and *c* record unit addresses is made by means of a group number, which is 0 for record unit addresses of node *a*, and 1 for record unit addresses associated with node *c*. Similarly, record unit addresses associated with node *b* and *d* are stored in consecutively addressable storage locations following a 1 assigned storage location." The record unit addresses associated with node *b* precede those associated with node *d* and, again, the record unit addresses associated with the two nodes are differentiated by means of the group number. Read-out from the storage locations takes place in the order of nodes *a*,*b*,*c*, and *d*; that is, the read out is determined first by the group number and secondly, within any group number, "0 assigned storage locations" are read out before the "1 assigned storage locations." In the examples shown in FIG. 1, no record unit addresses in the first address group had a second most significant bit of 1. Therefore the whole branch emanating from node *d*, and including said node, would be eliminated for the example illustrated in FIG. 1.

The numerals to the right of each node indicate the group number associated with record unit addresses represented by said node. The record unit addresses, for the next transfer constituting the next division into further sub-groups, are read-out in the order of *a*,*b*, and *c*. Each of the sub-groups represented by *a*,*b*, and *c*, is divided into a pair of successive sub-groups, in accordance with 0 and 1 values of the keyfield bit of bit value 4. It is seen by reference to FIG. 1 that node *b* represents only record unit address 5 which has a keyfield bit of 0 in the keyfield position signifying the value 4. Therefore node *h* does not exist in the example shown in FIG. 1. Record unit addresses stored consecutively in 0 storage locations are the record unit addresses represented by nodes *e*,*g*, and *i*. Again it should be noticed that the record unit addresses derived from the different nodes may be told apart by the associated group numbers.

The next transfer takes place under the control of bits of significance 2. Reference to FIG. 1 will show that nodes *k*,*p*, and *s* are not represented in the example of FIG. 1.

The final transfer under control of the keyfield bit of significance 1 results in the sorted address sequence. Nodes labeled with a prime are not represented in the example of FIGS. 1*a* and 1*b*. The nodes *a* is represented in the example of FIG. 1 and is record unit address 3. The eight existing nodes represent the record unit addresses in order of keyfield value.

Figure 3:
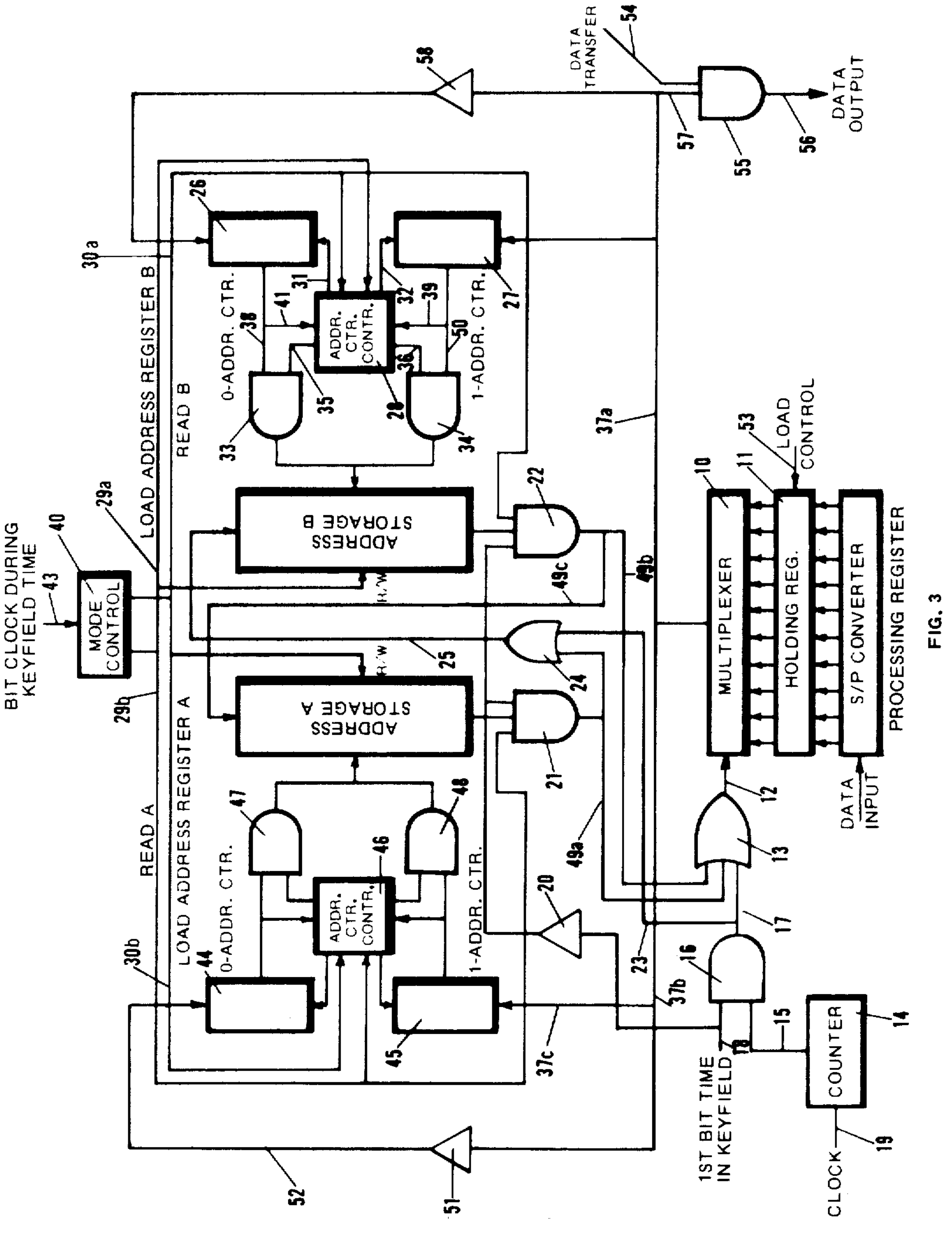
FIG. 3 is a block diagram of the sorting arrangement.

A preferred embodiment of an address rearrangement system in accordance with the present invention will now be discussed with reference, first, to FIG. 3. It will be noted that FIG. 3 is substantially equivalent to FIG. 4 of the parent application. It is included herein because it is essential for an understanding of the present invention, even though this invention is related mainly to the address storage control means 46 of FIG. 3 which is shown in more detail in FIG. 4 of the present application. FIG. 3 of the present application differs from FIG. 4 of the parent application only in the circuitry controlling mode control 40.

Referring now to FIG. 3, it will be noted that no comparator is present in this figure. The above-described method of record unit address transfer is used to effect the sorting. In the preferred embodiment shown in this application, record unit address storage means having selectively addressable storage locations are used, as was the case in the parent application.

It should be noted that in the preferred embodiment of this invention, as in the parent application, it is assumed that the record units are stored in a cyclic storage and that the bits thereof are accessible in series. It will further first be assumed that the keyfield precedes the other fields in the record units. The data may be stored in the above-mentioned cyclic storage in either an interlaced or a non-interlaced fashion. An overall system incorporating such cyclic storage arrangements in conjunction with a sorting system without comparator was described in detail in the parent application. This description will not be repeated here. For considering FIG. 3, it is only essential that it be understood that the record unit addresses are transferred from a first record unit address storage means, namely address storage A to a second record unit address storage means, namely address storage B and vice versa. In the system shown in FIG. 3 as a preferred embodiment, the transfer of all record unit addresses takes place within one bit time and transfer of a single record unit address is effected during a subbit time or time slot. It will be remembered that the division of the initial arbitrary sequence of record unit addresses into a first and second address groups took place under control of the most significant keyfield bit from each record unit. These keyfield bits are assumed to be the first bits read from the cyclic data storage containing the record units. They are received at the terminal marked "DATA INPUT" in FIG. 3. If they are received in series they are first put to a series-parallel converter and then transferred to a holding register (register means) under control of a load control signal shown at 53. The holding register is controlled in such a manner that, starting with the most significant keyfield bit, the next significant keyfield bits from all record units are entered therein at the beginning of each bit time. They are held therein until all record unit addresses have been transferred, each under control of the appropriate keyfield bit, namely each under control of the keyfield bit of the record unit addressable by it. A second set of keyfield bits comprising the next lower significant keyfiekd bit from each record unit is then entered at the beginning of the subsequent bit time. Bits of a given record unit are always entered into the same location in the holding register. Individual locations in the holding register may be addressed via register addressing means 10,13. Multiplexer 10 makes it possible to select any one of the bits stored in holding register 11 under control of signals on lines 12. It should be noted that while lines 12 are indicated as a single line, actually a plurality of lines is required in order to address each position of the holding register by means of the multiplexer. The simplification of indicating a plurality of lines as a single line is used throughout this Figure to avoid confusion.

Multiplexer 10 together with OR gate 13 having output lines 12 constitutes register addressing means. Mode control 40 is used to control the direction of transfer, that is whether the transfer takes place from address storage A to address storage B or vice versa. This mode control may simply be a flip-flop changed from one stable state to the other by the bit clock pulses, during the keyfield time, i.e., the time keyfield bits of the record units are furnished at the terminal marked "DATA INPUT."

During the time the most significant bit of each of the keyfields is stored in holding register 11, addresses on line 12 controlling multiplexer 10 are supplied by counter 14, via line 15, AND-gate 16, line 17, OR-gate 13. Counter 14 is controlled by subbit clock pulses on line 19. Counter 14 is advanced by as many clock pulses on line 19 as there are addressable register locations on holding register 11. Counter 19 constitutes input means and the counter output signals of counter 14 constitute the record unit addresses, since each counter output signal addresses a corresponding register location in holding register 11 and each register location in holding register 11 is supplied with the bits of a determined record unit in time sequence. AND gate 16 is enabled during this time by a timing signal on line 18 which inhibits AND gates 21 and 22 (respectively controlling the outputs of address storage A and address storage B) via inverter 20. Address signals passing AND-gate 16 during the first bit time of the keyfields of a group of record units are transferred via line 23, OR-gate 24, line 25 to the data input of address register B. The address input of address register B, i.e., the storage location wherein a record unit address is to be stored, is controlled by 0-address counter 26 and 1-address counter 27. During the first bit time interval, address counter control 28 and mode control 40 operate as follows: mode control 40 provides an active output signal on line 29*a* enabling address counter control 28 to operate. Address counter control 28 activates 0-address counter 26 via line 31. AND-gates 33 and 34, applying addresses from 0-address counter 26 and 1-address counter 27, respectively, to address storage B are activated by signals on lines 35 and 36 respectively. Either address counter 26 or address counter 27 may be used to address address storage B. The selection is made by the signal on line 37*a*, the output signal of multiplexer 10. If multiplexer 10 is addressed by a signal on line 12 to a register location of holding register 11 storing a 1-bit, the signal on line 27*a* will activate 1-address counter 27, which supplies its output (address) to determine the location in address storage B in which the corresponding record unit address is to be stored.

Specifically, an activated 1-address counter 27 supplies an address signal online 50 to AND-gate 34 for selecting the location in address storage B and via line 39 to address counter control 28 which in turn generates control signals on line 32 to advance 1-address counter 27 to the next storage address. The first output (address) furnished by counter 27 addresses the 1 assigned storage location in address storage B.

If the addressed register location in holding register 11 stores a 0-bit, the signal on line 37*a* will be inverted in inverter 58 and activate address counter 26 which supplies its address via line 38 to AND-gate 33 and address storage B. The first output (address) furnished by counter 26 is the "0 assigned storage location" of address storage B.

0-address counter 26 supplies signals via line 41 to address counter control 28 and receives counter advance signals via line 31. During the first bit time of the keyfield, address counters 26 and 27 control storage of record unit addresses supplied by counter 14 in address storage B.

It is seen that the division of the record unit addresses furnished in an arbitrary sequence by counter 14 into a first and second address group has taken place at this point. All record unit addresses have been stored under control of first and second location selecting means, namely the 0-address counter and the 1-address counter, respectively. The addresses corresponding to record units having a most significant keyfield bit 0 are stored in consecutively addressable storage locations following the "0 assigned storage location", namely the first address furnished by the 0-address counter. The second address group comprises all addresses addressing a record unit having a most significant keyfield bit of 1. These addresses are stored in storage locations following a "1 assigned storage location." The "0 assigned storage location" may for example be the first storage location in address storage B, while the "1 assigned storage location" may be the last address in said storage means. The 1-address counter can then be arranged to count backwards, while the 0-address counter counts forward. The means for determining where the first address group ends are contained in address counter control 28, which will be described in detail with reference to FIG. 4.

As soon as all keyfield bits in the first set of equally weighted bits of keyfields stored in holding register 11 have been interrogated (i.e., the most significant keyfield bits), the signal on line 18 is removed, deactivating AND-gate 16 and enabling gates 21 and 22 to respond to signals on their other two inputs. Simultaneously mode control 40 receives a first pulse on line 43 indicating the beginning of another bit time. Mode control 40 changes signals on output lines 29 and 30. In the new state, mode control 40 controls the transfer of record unit addresses stored in address storage B to address storage A. Address counter control 28 is switched into a read mode while counter control 46 operates in a write mode. The mode of operation of 0-address counter 44, 1-address counter 45, address counter control 46, and AND-gates 47 and 48, is identical to the operation described previously for the equivalent components 26, 27,28,33 and 34 of address register B. Address counter control 28 in read mode activates 0-address counter 26 via line 31 to read out record unit addresses from address storage B.

The order of read-out is determined by address counter control 28 and will be described in detail in conjunction with the description of FIG. 4. It may be said at this point, the read-out takes place in such a manner that record unit addresses addressing record units having the least keyfield value, insofar as known on the basis of previously evaluated keyfield bits, are read out first, followed by remaining record unit addresses in order of ascending keyfield value insofar as is known. Thus, under control of the second most significant keyfield bit, record unit addresses addressing record units having a most significant keyfield bit of 0 will precede record unit addresses addressing record units having a most significant keyfield bit of 1.

The so-read-out record unit addresses are transferred into address storage A in a manner identical to the previously-described storage in address storage B in dependence on the 0 or 1 value of the next significant (second most significant) keyfield bit.

The record unit addresses are thus transferred back and forth between address storage B and address storage A under control of mode control 40. The transfers continue until the least significant keyfield bit of each record unit has been utilized to determine the final storage location within either address storage A or address storage B of the corresponding record unit address. After this final transfer, the record unit addresses are arranged in order of keyfield value within one of the address storages. The so-arranged addresses can be used to control the transfer of the record units from, for example, one cyclic storage to the other in such a manner that the record units, which were arbitrarily stored in the first cyclic storage, are arranged in the second cyclic storage in order of keyfield value. This particular overall arrangement, as stated above, will not be discussed herein since it was discussed in the parent application. For purposes of this application, it suffices that the addresses are stored in one of the address storages in an order determined by the associated keyfield values.

The address storages A and B may, as mentioned in the parent application, by any non-destructive read-write memory such as Fairchild Semi-Conductor Memory 9033, or 9035. The multiplexers may be Fairchild's units 9309 or 9312. Clock signals, as mentioned in the parent application, may be derived directly from the cyclic storage means furnishing the record units.

Address counter control 46, associated with address storage A, will now be described in detail with reference to FIGS. 4 and 5. It should be noted that address counter control 28, associated with address storage B, is identical to the arrangement shown in FIG. 4, and will therefore not be described herein.

Figure 4:
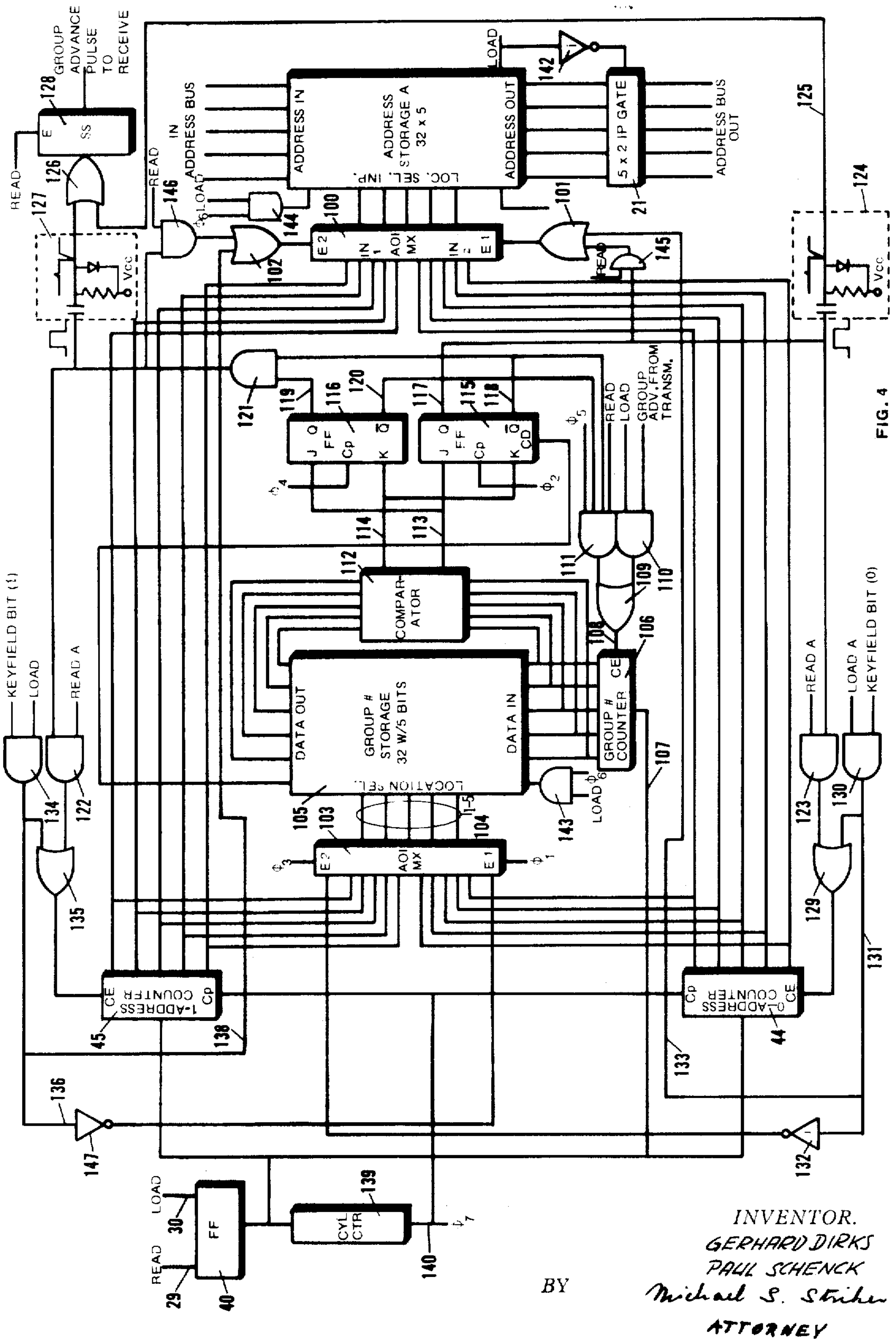
FIG. 4 is a detailed block diagram of the control arrangement required in FIG. 3.

FIG. 4 shows address storage A having a plurality of input lines labeled "IN ADDRESS BUS" and which are the equivalent of line 49*c* in FIG. 3. It further has a plurality of output lines, labeled "ADDRESS OUT" and leading into gate 21 which in turn has a plurality of output lines labelled "ADDRESS BUS OUT," equivalent to lines 49*a,d* of FIG. 3. Further, address storage A has a plurality of location selector inputs, signals at said inputs determining the location within address storage A from which a record unit address is to be read, or into which a record unit address is to be loaded. The location selector inputs are connected to the outputs of the second multiplexer means labeled 100 in FIG. 4. Multiplexer 100 has a first enable input labeled E1 and a second enable input labeled E2, as well as a plurality of first input lines and a plurality of second input lines. The first enable input is connected to the output of an OR gate 101 which constitutes second gating means, while the second enable input of multiplexer 100 is connected to the output of an OR gate 102, which constitutes additional gating means. The first plurality of input lines are connected to the output of first counting means, namely 0-address counter 44, while the second plurality of input lines to multiplexer 100 is connected to the output of the second counting means, namely 1-address counter 45. The output lines of counters 44 and 45 are also connected to the inputs of third multiplexer means labeled 103. The first input lines of multiplexer 103 become effective in the presence of an enable signal at a first enable input E1, while the input lines connected to the output of counter 45 become effective in the presence of an enable signal at the second enable input marked E2. Output lines $104^{1-5}$ of multiplexer 103 are connected to the group number location selector inputs of group number storage means, namely storage unit 105. Signals on lines $104^{1-5}$ select locations within group number storage 105 from which a group number is read, or into which a group number is loaded. Group number storage 105 further has a plurality of inputs labeled "DATA IN" and a plurality of outputs labeled "DATA OUT." The inputs for the "DATA IN" terminals are supplied by the output of a group number counter 106. Group number counter 106 has a reset input connected to line 107 and a counting input connected to line 108. Line 108 is connected to the output of an OR gate 109 which has a first and second input. The first input of OR gate 109 is connected to the output of third gating means, namely AND gate 110. The second input to OR gate 109 is connected to the output of AND gate 111, which constitutes gating means.

The output signals of group number counter 106 are further fed to the first inputs of a comparator 112 whose second inputs are connected to the "DATA OUT" lines of group number storage 105. Comparator 112 furnishes a first comparator output signal on line 113 when it receives identical inputs from group number storage 105 and group number counter 106, and a second comparator output signal on line 114 when these inputs are unequal. Line 113 is connected to the J input of first and second flip-flop means 115 and 116, respectively, while line 114 is connected to the K inputs of flip-flop means 115 and 116. Flip-flops 115 and 116 each have a further input labeled $Cp$ which receive clock pulses which will be described below and cause the flip-flops to assume the state determined by the signals on lines 113 and 114. Flip-Flop 115 has a Q output available on line 117 which results from an input at the J input, and is equivalent to a set state of flip-flop 115. Flip-flop 115 has a further output labeled $\bar{Q}$ available on line 118 which results from an input signal at the K input and corresponds to the reset state of flip-flop 115. Flip-flop 116 has similar Q and $\bar{Q}$ outputs, respectively, on lines 119 and 120. Lines 118 and 120 are connected to inputs of previously-mentioned AND gate 111, whose third input receives a timing or clock pulse $\phi 5$ which will be described below, as well as a READ pulse. Line 118 also serves as one input of an AND gate 121 whose other input is furnished by line 119. The output of AND gate 121 is connected to one input of AND gate 146 the output of which is connected to first input of OR gate 102, and is further connected to an input of AND gate 122. AND gate 122 constitutes fifth gating means and has a second input which is the READ A mode control signal corresponding to a signal on line 29*b* in FIG. 3. Line 117 is connected to one input of AND gate 145 the output of which is connected to first input of OR gate 101. Line 117 is further connected to one input of AND gate 123. AND gate 123, which constitutes fourth gating means is a further input receiving the above-mentioned mode control signal, READ A, which is equivalent to the signal on line 29*b* in FIG. 3.

Line 117 is further connected to the input of differentiating means 124 whose output is connected via a line 125 to the input of an OR gate 126 whose second input is connected to the output of a differentiating circuit 127; whose input is in turn connected to the output of AND gate 121. The output of OR gate 126 is connected to single-shot multivibrator 128 whose output constitutes the group advance pulse in the group number counter associated with address storage B. Specifically, the equivalent group advance pulse from address storage B is furnished to the first input of AND gate 110 whose second input is the mode control signal signifying LOAD, namely the signal on line 30 of FIG. 3. Single-shot multivibrator 128 is enabled only during the READ mode.

The output of previously-mentioned AND gate 123 is connected to the input of OR gate 129 whose second input is the output of AND gate 130. AND gate 130 constitutes the first gating means and has a first input which is the mode control signal signifying LOAD A, and is the signal equivalent to the signal on line 30b in FIG. 3. The second input to AND gate 130 is the signal on line 52 of FIG. 3, namely a signal signifying a key-field bit of 0. The output of AND gate 130 is connected via line 131 to an inverter 132 whose output is connected to the second enable input E2 of multiplexer 103 and inhibits this enable input. The output of AND gate 130 is also connected, via lines 131 and 133, to the second input of OR gate 101.

Further present in FIG. 4, are second gating means, AND gate 134, which has a first input connected to line 37*a* of FIG. 3 an active signal on which signifies a key-field bit of 1; and a second input responsive to the mode control signal signifying LOAD A. The output of AND gate 134 is connected to the input of OR gate 135 whose second input is furnished by the output of AND gate 122. The output of OR gate 135 enables counter 45. The output of AND gate 134 is also supplied, via line 136, to an inverter 147 whose output inhibits the first enable input E1 of multiplexer 103. The signal on line 136 is further connected via 138 to the second input of additional gating means, namely the OR gate 102.

Further shown in FIG. 4 is the mode control flip-flop 40 having outputs 29 and 30, and an input connected to the output of a cycle counter 139. The input to the cycle counter are timing pulses $\phi 7$ furnished on line 140. The output of the cycle counter is also connected to the reset inputs of counters 44,45, and 106.

Figure 5:
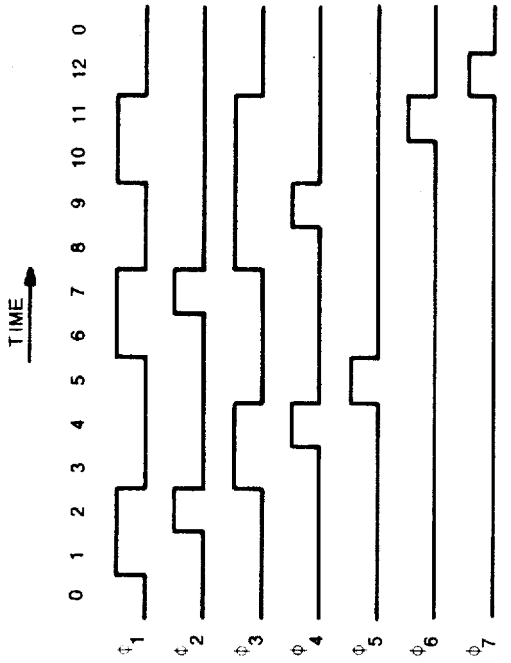
FIG. 5 is a timing diagram illustrating the timing of signals in FIG. 4.

The above-described arrangement, in conjunction with the timing signals (clock signals) shown in FIG. 5 operates as follows:

Cycle counter 139 receives signals shown on the bottom line of FIG. 5; that is, one timing signal is received for each record unit address transferred from one record unit address storage means to the other. These inputs are counted by cycle counter 139 and a terminal count signal is issued at its output when all record unit addresses stored in either address storage A or address storage B have been transferred and entered into the other of the two storages. The output of cycle counter 139 further changes flip-flop 40, the mode control flip-flop, from one state to the other alternately. It will be assumed here that an active signal first exists on line 29 causing a read-out of record unit addresses from address storage A.

It will be noted with respect to FIG. 5, that the horizontal axis is the time axis which is divided into 13 intervals per cycle, that is per subbit time interval. Signals in intervals 0 through 9 are effective during the READ mode of operation, while signals 10 through 11 effective during LOAD mode. Interval 12 is common to both modes.

In the interval 0, the system is in a quiescent state.

In interval 1, the timing signal $\phi 1$ (top line) is applied to the first enable input of multiplexer 103 and therefore causes the output signals of counter 44 to be applied to the location selector inputs of group number storage 105. The group number in the addressed location is fed to one input of comparator 112 and compared with the output of group counter 108. The comparison result appears on either line 114 or 113, deplending upon whether the two inputs are equal or unequal.

In interval 2, the timing signal $\phi 2$ is applied to the *Cp* input of flip-flop 115 causing this flip-flop to set or reset in dependence on an active signal on line 113 or line 114, respectively.

In time interval 3, timing signals $\phi 1$ and $\phi 2$ are removed and signal $\phi 3$ is applied to the second enable input of multiplexer 103 causing the outputs of counter 45 to be applied to the inputs of multiplexer 103, thereby causing the outputs of multiplexer 103 corresponding to said inputs to be applied to the location selector inputs of group number storage 105. Again, comparator 112, compares the output in the so-addressed storage location with the output of group number counter 106 and generates an active signal on line 113 if these are equal, and an active signal on line 114 if these are unequal. Timing signal $\phi 4$ is then applied to the *Cp* input of flip-flop 116 causing this flip-flop to set or reset depending upon whether line 113 or 114 carries an active signal.

It will be noted that at this time flip-flops 115 and 116 can be in any one of the four possible combinations of state. All but the all reset state will allow proper operation.

In interval 5, the timing signal $\phi 5$ is applied to the input of AND gate 111. The remaining inputs of AND gate 111 are connected to the $\bar{Q}$ outputs of flip-flops 115 and 116, as mentioned above. Therefore, all conditions for an output from AND gate 111 exist upon application of timing signals $\phi 5$ if both flip-flops are in the reset state. The signal furnished by AND gate 111 is then transmitted via OR GATE 109 to group number counter 106, causing this counter to advance by one count.

In intervals 6,7,8 and 9, the exact action described for intervals 1,2,3, and 4 is repeated. If flip-flops 115 and 116 were not previously both in the reset state, then no change in the flip-flop states will occur during intervals 6,7,8, and 9.

It will be noted that at this point either enable input E1 or enable input E2 of multiplexer 100 has a positive enabling signal since either flip-flop 115 is set enabling input E1 of multiplexer 100 via OR gate 101 or flip-flop 116 is set and flip-flop 115 is reset causing the second enable input E2 of multiplexer 100 to receive an enabling signal via AND gate 121 and OR gate 102. Therefore, the counting outputs of either counter 44 or counter 45 serve as an active input signal for multiplexer 100. Thus, either counter 44 or counter 45 furnishes the location selector signals to address storage A which determine the location in this address storage from which a record unit address is to be read. The read-out occurs instantaneously and the desired record unit address is furnished at the "ADDRESS OUT" line of address storage A, and is transmitted through gate 21 to the "ADDRESS BUS OUT" since inverter 142 has an active output signal due to the absence of the LOAD signal at its input.

During interval 10, signals on lines $\phi 1$ and $\phi 3$ are both active, but no change in the flip-flop occurs when the system is in READ mode since timing signals $\phi 4$ and $\phi 2$ are not supplied.

Interval 11 is also an inactive interval in the READ mode since the presence of signal $\phi 6$ is also ineffective due to the absence of the LOAD signal at the second inputs of AND gate 143 and AND gate 144.

In time interval 12, all signals except $\phi 7$ are removed. It should be noted that either AND gate 123 or AND gate 122 will now have an active output signal, depending upon conditions of flip-flops 115 and 116. Therefore, either counter 44 or counter 45 will be enabled, respectively, via OR gate 129 or OR gate 135. Timing pulse $\phi 7$ will then cause whichever counter is enabled to advance by one count. This of course initiates the transfer of the next record unit address from address storage A to address storage B. Furthermore, signal $\phi 7$ also advances cycle counter 139 by one count. When all record unit addresses have been read from address storage A, cycle control counter 139 generates a terminal count signal at its output, causing flip-flop 40 to switch to the second stable state wherein an active signal exists on line 30. The terminal count signal also resets counters 44,45, and 106.

It should be noted that during the read-out operation, a dropping of the signal level at the output of AND gate 121, due to the resetting of flip-flop 116 or a drop of the output level on line 117 due to resetting of flip-flop 115 is differentiated by differentiating means 127 or 124, respectively, causing a signal to be applied to OR gate 126 whose output causes single-shot multivibrator 128 to furnish a group counter advance pulse to the equivalent of AND gate 110 associated with address storage B. This group advance pulse can be generated only in intervals 2 or 4.

The terminal count furnished by cycle counter 139 further causes flip-flop 40 to change to the second stable state wherein an output signal is now furnished on line 30, causing the circuitry of FIG. 4 to switch to the LOAD mode of operation. Timing signals during time intervals 0 through 9 do not cause any effect, since the outputs of flip-flops 115 and 116 do not actively enable either OR gate 102 or OR gate 101 because of the interposed AND gates 145 and 146 which cause these signals to be ineffective in the absence of a READ signal.

Timing signal $\phi 5$ is also ineffective since AND gate 111 has a required READ signal input.

In the LOAD mode, AND gate 130 issues an active output signal when there is an active signal on line 52 of FIG. 3, that is when a keyfield bit 0 is controlling the transfer. This signal at the output of AND gate 130 is transferred via line 131 to inverter 132 and inhibits the second enable input of multiplexer 103. The signal further enables the first enable input of multiplexer 100 via OR gate 101. Thus, if the record unit address to be transferred is being transferred under control of a 0 keyfield bit, both first enable inputs of multiplexers 100 and 103 are active causing 0-address counter 44 to furnish location selector signals for both storage 105 and address storage A. If, however, the keyfield bit is a 1, then AND gate 134 has an active signal enabling address counter 45, inhibiting first enable input E1 of multiplexer 103, and enabling the second input E2 of multiplexer 100 via OR gate 102. Thus, one of address counters 44 or 45 is effective depending upon whether the keyfield bit is a 0 or 1.

In timing interval 10, all signals $\phi 3$ and $\phi 1$ are active. However, as discussed above, only one of these will actually be effective because of the inhibiting inputs from AND gates 130 or 134.

In time interval 11, signals $\phi 1$ and $\phi 3$ are still active and timing signal $\phi 6$ is also applied. Since the system is now in LOAD mode, AND gate 143 causes the signal at group counter output 106 to be applied to group number storage 105 and to be stored in the location determined by the signals on the location selector lines $104^{1-5}$.

Similarly, an active output at AND gate 144, in response to the LOAD mode signal and timing signal $\phi 6$ causes the record unit address available on lines 49c (read-out from address storage B within the same cycle) to be stored in address storage A in a location determined by the signals at the location selector inputs.

It is seen that under control of the cycle counter 139, record unit addresses are transferred back and forth between address storage A and address storage B, as required to arrange the record unit addresses in such an order that the corresponding keyfields are arranged in accordance with the keyfield values. Only one feature must be present in the equipment associated with address storage B which is not present in that described in FIG. 4. It will be noted that the arrangement of FIG. 4, when addresses are first entered into address storage B under control of counter 14 (FIG.3), there is no way of determining during read-out from address storage B where record unit addresses of the first sequence end and those of the second address sequence (namely those transferred to "1 assigned storage locations") begin. In order to differentiate those record unit addresses entered under control of 0 keyfield bits from those under control of 1 keyfield bits, means must be provided in group number storage means associated with address storage B to store a 1 bit for each record unit address entered into address storage B under control of counter 14. This can be accomplished by an AND gate having the same input as line 18 of FIG. 3 and having an input from line *37a* (active signal if a keyfield bit is 1). The output of this AND gate would then be entered into a storage location in the group number storage associated with address storage B which is read out simultaneously with the group number (0) of the corresponding record unit address. When this signal is first read out, it is applied to a clear-direct (CD) input of the flip-flop corresponding to flip-flop 115, causing this to be reset. This would cause the read-out control for address storage A to be switched to the 1-address counter associated therewith. The line connected to the clear-direct input of flip-flop 115 is shown as line 141 in FIG. 4.

It should also be stated that the timing of single-shot multivibrator 128 is such that two consecutive inputs received during one cycle only cause one output signal to be generated.

The method whereby the keyfield bits are transferred into holding register 11 (FIG. 3) from a first cyclic storage means and the way in which the data output is generated on line 56 under control of the record unit addresses stored in one of the address registers following the sorting operation, is described in detail in the parent application. This will not be repeated here. The method and arrangement of the herein disclosed invention is entirely independent of the particular method and arrangement used for furnishing the keyfield bits and for reading out the record units under control of the sorted record unit addresses. The method and arrangement of the present invention are entirely independent of the manner in which the keyfield bits are supplied, except that, of course, the correct keyfield bit must be available at the correct time. Therefore, the method and arrangement of the present invention can be suited to a great number of overall systems wherein rapid sorting with a minimum of equipment and for record units having keyfields arranged in descending order of significance is required.

The equipment required herein may be bought as off-the shelf items as follows:

ITEM

INTEGRATED CIRCUITS (taken from Fairchild Catalog)

1. address storages (9033 and 9035)
2. counters (9306, 9316, 9356)
3. multiplexers (9005, 9322)
4. flip-flops (9020, 9022)
5. comparator (9324); and
6. single-shot multivibrator (9601)

Each of these standard function integrated circuits has a defined capability such as a 64-bit storage 9305, a 4-bit counter 9316, a 5-bit comparator 9324, which can be expanded by use of another device of the same type, or by gates and flip-flops without changing its logic function and characteristic.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A method for using a computer to sort a plurality of record units, each having a keyfield including a plurality of keyfield bits arranged in descending order of significance, comprising the steps of:

a. generating a plurality of electrical signals representing record unit addresses each addressing a corresponding one of said record units, said addresses being initially arranged in an arbitrary sequence with respect to the keyfield values of the record units with which they are respectively associated;

b. separating said record unit addresses into two groups of addresses, said groups comprising respectively all addresses corresponding to record units having a most significant keyfield bit of 0 and 1;

c. separating each of said two groups of addresses into two sub-groups of addresses in accordance with 0 and 1 values in the keyfield bit position following said most significant keyfield bit in said descending order of significance;

d. associating with the addresses comprising each sub-group and indicator reflective of the preceding source group from which said addresses were derived.

e. repeating the steps of forming successive pairs of sub-groups of addresses in accordance with keyfield bit values of successively decreasing significance and modifying the indicator associated with the addresses contained therein to reflect the source of said addresses until the least significant bit position in said record unit keyfields has been examined and a sequence of said addresses ordered according to said indicator numbers corresponds to a sequence of said record units ordered according to said keyfield values.

2. A method as set forth in claim 1 wherein said step of separating said record unit addresses into two groups comprises furnishing the most significant bit of all record units substantially simultaneously, each in a corresponding keyfield bit location addressable by the corresponding record unit address; reading out the most significant keyfield bit corresponding to each of said record unit addresses; and transferring record unit addresses having a most significant keyfield bit of 0 to a first one of said groups and record unit addresses having a most significant keyfield bit of 1 to a second one of said groups.

3. A method as set forth in claim 2, wherein transferring said record unit addresses to said first group comprises storing said record unit addresses in consecutively addressable storage locations following a first 0 assigned storage location, said so-filled storage locations constituting first 0 locations; and wherein transferring said record unit addresses to said second group comprises storing said record unit addresses in consecutively addressable storage locations following a first 1 assigned storage location, said so-filled storage locations constituting first 1 locations.

4. A method as set forth in claim 3, wherein separating each of said groups into two sub-groups comprises consecutively addressing said first 0 locations and said first 1 locations; transferring record units stored therein having an associated keyfield bit of 0 to consecutively addressable storage locations following a second 0 assigned storage location, said so-filled storage locations constituting second 0 locations and transferring record unit addresses stored therein having an associated keyfield bit of 1 to consecutively addressable storage locations following a second 1 assigned storage location, said so-filled storage locations constituting second 1 locations; and storing said indicator in association with each record unit address transferred .

5. A method as set forth in claim 4, wherein said indicator is the same indicator for each of said record units.

6. A method as set forth in claim 5, further comprising additional transfers of said record unit addresses between said first and second 0 and 1 locations, each under control of keyfield bit of the next lower order of significance in said descending order of significance; further comprising the step of increasing said indicator associated with a record unit address by a predetermined increment each time said record unit address is transferred from one of said 1 locations.

7. A method as set forth in claim 6, wherein the order of addressing said locations during each of said transfers is determined at least in part by the indicators associated with the record unit addresses stored in said locations.

8. A system of sorting a plurality of record units, each having a keyfield, each of said keyfields comprising a plurality of keyfield bits arranged in descending order of significance, comprising, in combination, register means, storing said keyfield bits in addressable register locations; first and second record unit address storage means; input means operatively associated with said first record unit address storage means for furnishing record unit addresses in an arbitrary sequence with respect to keyfield value and for entering said record unit addresses, each providing access to a corresponding record unit, into said first record unit address storage means; register addressing means connected to said register means and said first and second record unit address storage means, for furnishing selected keyfield bits at least in part under control of said record unit addresses; and address transfer means interconnecting said first and second record unit address storage means and said register means, for transferring record unit addresses back and forth between said first and second record unit address storage means at least in part under control of said selected keyfield bits, in such a manner that the storage location of each of said record unit addresses following a transfer is a function of the 0 or 1 value of the corresponding selected keyfield bit and of the values of the keyfield bits within the same keyfield preceding said selected keyfield bit in said descending order of significance.

9. A system as set forth in claim 8, wherein each of said addressable register locations is addressable by a corresponding one of said record unit addresses; and wherein each of said keyfield bits is stored in an addressable register location addressable by its associated record unit address.

10. A system as set forth in claim 9, wherein said register addressing means comprise multiplexer means.

11. A system as set forth in claim 10, further comprising mode control means alternately furnishing a first and second mode control signal; and wherein said address transfer means transfers said record unit addresses from said first to said second record unit address storage means in response to said first mode control signal and from said second to said first record unit address storage means in response to said second mode control signal.

12. A system as set forth in claim 10, wherein said first and second record unit address storage means have, respectively, a first and second 0 assigned storage location and a first and second 1 assigned storage location; wherein said address transfer means comprise first address transfer means operatively associated with said first record unit address storage means, said first address transfer means comprising first and second location selecting means respectively addressing consecutively addressable storage locations following said first 0 assigned storage location and said first 1 assigned storage location in response to first and second gating output signals respectively; further comprising first gating means furnishing a first gating output signal in response to simultaneous presence of an 0 selected keyfield bit and said second mode control signal; and second gating means for furnishing a second gating output signal in response to simultaneous presence of a 1 selected keyfield bit and said second mode control signal.

13. A system as set forth in claim 12, wherein said first record unit address storage means has a plurality of location selector inputs; wherein said first and second location selecting means comprise first and second counting means; further comprising second multiplexer means having second multiplexer inputs connected to the outputs of said first and second counting means and furnishing location selector signals to said location selector inputs of said first record unit address storage means in correspondence with signals applied at said second multiplexer inputs.

14. A system as set forth in claim 13, wherein location selector signals corresponding to signals furnished by said first counting means select locations following said first 0 assigned storage location, and location selector signals corresponding to signals furnished by said second counting means select locations following said first 1 assigned storage location.

15. A system as set forth in claim 14, further comprising group number storage means operatively associated with said first record unit address storage means, said group number storage means having a plurality of group number storage locations corresponding in number to the number of storage locations in said first record unit address storage means, each for storing a group number associated with the one of said record unit addresses stored in the corresponding one of said record unit address storage locations; and group location selector means interconnected between said first and second counting means and said group number storage means for addressing storage locations in said group number storage means in dependence on signals furnished by said first and second counting means.

16. A system as set forth in claim 15, wherein said group location selector means comprise third multiplexer means.

17. A system as set forth in claim 15, wherein said group number storage means comprise a data input; further comprising group number counting means having a group number output connected to said data input, and a group counter input; further comprising third gating means connected to said group counter input.

18. A system as set forth in claim 17, further comprising comparator means having a first comparator input connected to the output of said group number storage means, a second comparator input connected to the output of said group number counting means, and a comparator output furnishing a first comparator output signal indicative of equal inputs and a second comparator output signal indicative of unequal inputs.

19. A system as set forth in claim 18, further comprising first and second flip-flop means, each having a reset enable input connected to said second comparator output, a set enable input connected to said first comparator output, and a set and reset output.

20. A system as set forth in claim 19, further comprising fourth gating means having an output connected to said first counting means and furnishing one of said first gating output signals in response to simultaneous presence of said first mode control signal and said set output of said first flip-flop means; also comprising fifth gating means having an output connected to said second counting means and furnishing one of said second gating output signals in response to simultaneous presence of said first mode control signal, said set output of said second flip-flop means and said reset output of said first flip-flop means.

21. A system as set forth in claim 20, wherein said second multiplexer means have a first and second enable input, signals applied at said first and second enable inputs enabling second multiplexer inputs connected to said first and second counting outputs respectively; and wherein said second multiplexer means further comprise second multiplexer gating means having an output connected to said first enable input of said second multiplexer means, a first input connected to the output of said first gating means and a second input connected to said set output of said first flip-flop means; and wherein said second multiplexer means further comprise additional second multiplexer gating means having an output connected to said second enable input, a first input connected to the output of said second gating means and a second input connected to said set output of said second flip-flop means and said reset output of said first flip-flop means.

22. A system as set forth in claim 19, further comprising means for furnishing a group counter advance pulse in response to a change in said first or said second flip-flop means from a set to a reset state.

23. A system as set forth in claim 22, further comprising timing signal furnishing means furnishing bit time signals; and means interconnecting said mode control means and said timing signal furnishing means in such a manner that said mode control means furnish said first and second mode control signal alternately in response to consecutive ones of said bit time signals.

24. A system as set forth in claim 23, wherein said timing signal furnishing means further furnish a plurality of subbit time signals at predetermined substantially equal intervals between consecutive ones of said bit time signals, the interval between consecutive ones of said subbit time signals constituting a subbit time interval.

25. A system as set forth in claim 24, further comprising register input means for entering into said register means, in sequence, a plurality of sets of keyfield bits, each of said sets comprising a keyfield bit of the same significance from each of said record units.

26. A system as set forth in claim 25, wherein said register means comprise a plurality of addressable register locations corresponding in number to the number of said record unit addresses; and wherein each of said addressable register locations is addressable by a corresponding record unit address.

27. A system as set forth in claim 26, further comprising means for applying said subbit time signals to said register input means for timing the operation thereof in such a manner that, for each of said subbit time signals, a set of said keyfield bits is entered.

28. A system as set forth in claim 27, wherein said means for furnishing timing signals further comprise means for furnishing, within each of said subbit time intervals, first additional timing signals, applied in a predetermined sequence in time to said second enable input of said third multiplexer means, said first flip-flop means, said first enable input of said third multiplexer means, and said second flip-flop means, thereby setting said first and second flip-flop means for furnishing inputs to said second multiplexer gating means.

29. A system as set forth in claim 28, wherein said means for furnishing timing signals further furnish further timing signals following said additional timing signals for timing inputs into said first and second record unit address storage means and advancing said first and second counting means.

* * * * *